United States Patent [19]

Mueller et al.

[11] 4,324,724
[45] Apr. 13, 1982

[54] MANUFACTURE OF POLYALKYLENEPOLYAMINES

[75] Inventors: Hans Mueller; Klaus Wulz, both of Ludwigshafen; Karl-Heinz Beyer, Frankenthal; Werner Streit, Bobenheim, all of Fed. Rep. of Germany

[73] Assignee: BASF Aktiengesellschaft, Fed. Rep. of Germany

[21] Appl. No.: 947,585

[22] Filed: Oct. 2, 1978

[30] Foreign Application Priority Data

Oct. 6, 1977 [DE] Fed. Rep. of Germany ....... 2744982

[51] Int. Cl.³ .................... C07C 85/04; C07C 85/02; C07D 295/12; C07D 203/12
[52] U.S. Cl. .................... 260/239 E; 528/422; 544/358; 544/402; 548/352; 548/379; 564/468; 564/481
[58] Field of Search .................... 528/422; 260/583 P, 260/583 N; 544/358, 402; 548/352, 379; 260/239 E; 564/468, 481

[56] References Cited

U.S. PATENT DOCUMENTS 2,364,178 12/1944 Wilson ............................ 260/583 P
2,808,438 10/1957 Mizzoni et al. ................. 260/583 P
3,151,160 9/1964 Spivack .......................... 260/583 P

FOREIGN PATENT DOCUMENTS 1418302 12/1975 United Kingdom ............... 528/422

OTHER PUBLICATIONS

Helvetica Chimica Acta 55, No. 112 (1972), 1105–1110.

Primary Examiner—V. P. Hoke
Attorney, Agent, or Firm—Keil & Witherspoon

[57] ABSTRACT

A process for the manufacture of polyalkylenepolyamines by reacting a primary or secondary amine with a compound of the formula

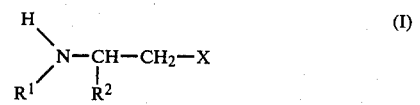

where X is —Cl, —Br, or —OSO₃H and R¹ and R² are H or saturated alkyl of 1 to 4 carbon atoms, and with at least the stoichiometric amount, based on the compound of the formula I, of an aqueous solution, of from 15 to 45 percent strength, of an alkali metal hydroxide or alkaline earth metal hydroxide, at from 60° to 200° C., cooling the reaction mixture to a temperature at which 2 aqueous phases form, and separating off the upper phase, containing polyalkylenepolyamnines. The rate of reaction can be increased by adding catalytic amounts of compounds which initiate the polymerization of alkyleneimines.

5 Claims, No Drawings

MANUFACTURE OF POLYALKYLENEPOLYAMINES

The present invention relates to a process for the manufacture of polyalkylenepolyamines by reacting a primary or secondary amine with a compound of the formula

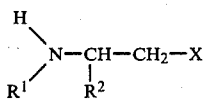
(I)

where X is —Cl, —Br or —OSO$_3$H and R$^1$ and R$^2$ are H or saturated alkyl of 1 to 4 carbon atoms and with at least a stoichiometric amount, based on the compound of the formula I, of a base, in aqueous solution.

The reaction of primary and secondary amines with ethyleneimine to give polyalkylenepolyamines is known. According to J. Rabinowitz in Helvetica Chimica Acta 55, No. 112, (1972), 1104–1110, an amine in aqueous solution or in solution in a water/alcohol mixture is heated with 2-aminoethyl sulfate and sodium hydroxide solution. Ethyleneimine is formed as an intermediate and reacts further with the amine to give a polyaminoalkylated amine. The reaction mixture essentially consists of sodium sulfate, a saturated aqueous or aqueous-alcoholic sodium sulfate solution and polyaminoalkylated amine dissolved therein. To isolate the latter, the reaction mixture is first evaporated, under reduced pressure, to half its volume, alcohol is added to cause the dissolved sodium sulfate to separate out substantially completely, and the mixture is filtered. This gives an aqueous alcoholic solution of the polyaminoalkylated amine, which can be separated into its constituents by distillation. The process is technically involved because the alcohol must be removed by distillation and the removal of the sodium sulfate residue causes losses of polyaminoalkylated amine and alcohol.

It is an object of the present invention to simplify the process described at the outset and especially to simplify the working-up of the reaction mixture. It is a further object of the invention to improve the space-time yield of the process.

We have found that these objects are achieved by a process wherein an aqueous solution, of from 15 to 45% strength, of an alkali metal hydroxide or alkaline earth metal hydroxide, is employed, the reaction is carried out at from 60° to 200° C., the reaction mixture is cooled, whilst being mixed, to a temperature at which two phases form and the upper phase, containing polyalkylenepolyamines, is separated off. It is particularly advantageous if the aqueous solution of the alkali metal hydroxide or alkaline earth metal hydroxide is saturated with sodium sulfate.

The reaction rate can be increased substantially by carrying out the reaction in the presence of a compound which reacts with alkyleneimines at a pH of from 9 to 14, for example an alkyl halide or aryl halide, urea, or an OH-containing compound, e.g. an alcohol, aminoalcohol and hydroxylamine. These compounds are used as polymerization initiators for the polymerization of pure ethyleneimine.

Any primary or secondary amine can be polyaminoalkylated by the process according to the invention. Taking the example of a primary amine and of 2-aminoethyl sulfate, the reaction can be represented schematically by the following equation:

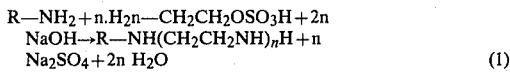
(1)

The reaction mixture obtained contains sodium sulfate, as a saturated aqueous solution and as a solid sediment, as well as polyaminoalkylated amine with a degree of aminoalkylation n, which preferably is at least 2.

The degree of aminoalkylation is varied by varying the ratio of amine to 2-aminoethyl sulfate and sodium hydroxide solution. As may be seen from equation 1, two moles of a monoacid base are used per mole of compound of the formula I. For example, 2-aminoethyl sulfate and sodium hydroxide solution initially form ethyleneimine and sodium sulfate; the ethyleneimine is detectable by means of γ-4-nitrobenzylpyridine. To obtain an alkyleneimine from the compound of the formula I, at least the stoichiometric amount of base is required, according to equation I. An excess of base is not necessary, but can be employed; for example, from 2.5 to 3 equivalents of base can be employed per mole of compound of the formula I.

The alkyleneimines formed as intermediates can, as secondary amines, be subjected to polyaminoalkylation. It is not necessary to carry out the reaction of alkyleneimines in the presence of secondary or primary amines.

Suitable amines which can be aminoalkylated by the process according to the invention are, for example, compounds of the formula

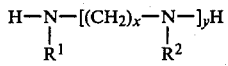

where x is an integer from 0 to 6 and y is an integer from 1 to 500, R$^1$ is hydrogen, hydroxyl, alkyl, aryl, hydroxyethyl, hydroxypropyl, aminoethyl, aminopropyl or substituted or unsubstituted amino and R$^2$ is also a substituent of the type of R$^1$, except for hydroxyl. Examples of amines of this type are N-aminoethyl-1,2-diaminoethane, N-aminopropyl-1,2-diaminoethane, N,N'-bis-(aminoethyl)-1,2-diaminoethane, N,N'-bis-(aminopropyl)-1,2-diaminoethane, ethylenediamine, bis-hydroxyethylenediamine, hydroxyethyldiethylenetriamine, diethylenetriamine, triethylenetetramine, hydroxylamine and hydrazine and their derivatives, urea and urea derivatives which contain at least one NH group, primary and secondary aliphatic and aromatic amines, hexamethylenediamine, bis-(hexamethylene)-triamine, ethanolamine and carboxylic acid amides.

In addition to the above compounds, primary and secondary aliphatic and aromatic amines may be used, eg. methylamine, ethylamine, dimethylamine, stearylamine, oleylamine, aniline and substituted anilines, as well as heterocyclic compounds, eg. piperazine, aminoethylpiperazine, aminopropylpiperazine, imidazoline, pyrazoline and ethyleneimine.

The amines in question are reacted with a compound of the formula

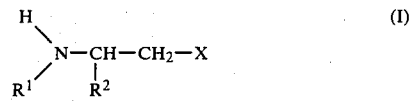
(I)

This compound is preferably selected from 2-aminoethyl sulfate and a compound where X is chlorine and $R^1$ and $R^2$ are hydrogen.

Alkali metal hydroxides and alkaline earth metal hydroxides used in the process according to the invention are lithium hydroxide, sodium hydroxide, potassium hydroxide, magnesium hydroxide, calcium hydroxide, barium hydroxide, strontium hydroxide and mixtures of these. However, the corresponding oxides can also be used; as is known, they are converted to the hydroxides in aqueous solution. The term alkali metal hydroxide is not intended to include bases derived from ammonia of from ammonia derivatives. Preferred bases are sodium hydroxide, potassium hydroxide and mixtures of sodium hydroxide and calcium hydroxide.

It is characteristic of the process of the invention that an aqueous solution, of from 15 to 45% strength, of the alkali metal hydroxide or alkaline earth metal hydroxide is employed. If, for example, the aqueous sodium hydroxide solution used is of 10% strength or of 50% strength, polyaminoalkylation of the amines nevertheless occurs, but after the reaction the mixture does not separate into two aqueous phases. However, it is the formation of these two aqueous phases which is an essential feature of the present invention. The reaction is carried out at from 60° to 200° C., preferably at the boiling point of the reaction mixture, under reflux. The reaction can be accelerated by carrying it out at higher temperatures, under superatmospheric pressure. The boiling point of the reaction mixture is in general from 80° to 110° C.

The reaction time is from about 30 to 100 hours. It depends on the amine employed, the reactivity of the alkyleneimine derivative formed as an intermediate, and the concentration of the base. The alkyleneimine intermediate is consumed in the reaction at the rate at which it is formed, so that its concentration in the reaction mixture is always low. The reaction is complete when aziridine rings are no longer detectable by means of γ-4-nitrobenzylpyridine.

During the reaction, thorough mixing of the individual components is ensured, for example by stirring the mixture, boiling it or passing an inert gas through it. When no further alkyleneimine is detectable, the reaction mixture is cooled; advantageously, mixing is continued during cooling so that the inorganic salt separates out in a form which is easily filtered off. The reaction mixture is cooled at least to a temperature at which two phases form. This temperature can easily be found by, for example, taking a sample of the reaction mixture and ascertaining at what temperature the mixture separates into two phases. As already stated, it is advisable to agitate the reaction mixture during cooling, for example by stirring, shaking, shearing or introducing nitrogen.

As soon as the reaction mixture has been cooled to a temperature within the range in which two phases form, it is allowed to sediment. At this stage, mixing should of course be stopped. The polyalkylenepolyamine obtained from the reaction is essentially contained in the upper phase, which is separated off. Part of the polyalkylenepolyamine is also contained in the saturated aqueous solution of the inorganic salt formed during the reaction. The inorganic salt separates out as crystals at the bottom of the vessel, and can be filtered off easily. The saturated aqueous solution of the inorganic salt, which is obtained as a lower phase of the reaction mixture, can be re-used in subsequent reactions of compounds of the formula I. This has the advantage that separating off the lower aqueous phase results in virtually no losses of polyalkylenepolyamines.

The upper aqueous phase contains from 30 to 50, as a rule from 35 to 45, % by weight of polyalkylenepolyamine, and from 1 to 2% by weight of sodium sulfate. For most applications it suffices if the aqueous upper phase which has separated off and contains polyalkylenepolyamines is directly processed further, for example employed for a further aminoalkylation reaction, or used for the manufacture of retention aids and drainage aids for the paper industry, or as an intermediate for the manufacture of flocculating agents for solids contained in effluents. The polyalkenepolyamines manufactured according to the invention cannot be distilled; they are not volatile even in a high vacuum at 250° C.

Surprisingly, it proves possible to increase the rate of reaction substantially by using, in the aminoalkylation reaction, compounds which react with alkyleneimines at a pH of from 9 to 14. These compounds form cations with alkyleneimines and in some cases are also used as catalysts for the polymerization of ethyleneimine. Examples of suitable compounds of this type are halogen-containing compounds, for example aromatic and aliphatic, saturated and unsaturated hydrocarbons, eg. 1,2-dichloroethane, 1,2-dichloropropane, 1,2-dibromomethane, methyl chloride, ethyl chloride, butyl chloride, methylene chloride, tert.-butyl chloride, ethyl iodide, vinyl chloride, propargyl chloride, chlorobenzene, chloroacetic acid, acrylyl chloride, benzyl chloride, benzyl bromide and bromobenzene, and haloethers, eg. chloromethyl propyl ether and chloromethyl butyl ether. Further compounds which react with alkyleneimines at a pH of from 9 to 14 include urea, hydrazine and OH-containing compounds, for example monohydric and polyhydric alcohols, eg. methanol, ethanol, propanol, isopropanol, butanol, sec.-butanol, tert.-butanol, octanol, oleyl alcohol, glycol, butane-1,4-diol, glycerol, pentaerythritol, pentoses, hexoses, disaccharides, polysaccharides, pectins, polyvinyl alcohol, aminoalcohols, phenols, hydroxyacids, hydroxylamine, and their derivatives.

Advantageously, the catalyst selected is a compound which has a boiling point corresponding to that of the reaction solution, or higher than the latter, or a compound which dissolves in the reaction mixture. Catalytic amounts suffice to accelerate substantially the reaction of primary or secondary amines with compounds of the formula I and bases. At present, we cannot provide an explanation for the acceleration of the reaction produced by adding the catalysts in question. The required catalytic amounts of the relevant compounds are from about 0.05 to 1, preferably from 0.1 to 0.5, % by weight of catalyst, based on total volume of the reaction solution. Advantageously, the catalyst is added to the cold reaction solution, but it can also be introduced after the components have been heated to the reaction temperature of the mixture. Another possible method is to add a solution of the catalyst in sodium hydroxide solution, or in aminoalkyl sulfate, to the reaction mixture.

When using the above catalysts, which can be employed either individually or as mixtures with one another, it proves possible, for example, to reduce the reaction time of aminoalkylation by means of 2-aminoethyl sulfate and sodium hydroxide solution from 70 to 7 hours, ie. by about a factor of 10.

The process according to the invention gives polyalkylenepolyamines which contain primary and secondary nitrogen and, with increasing molecular size, also tertiary nitrogen. For example, a polyalkylenepolyamine containing 4 nitrogen atoms can be prepared by reacting 1 mole of ethylenediamine with 2 moles of 2-aminoethyl sulfate. The reaction may be represented by the following equation:

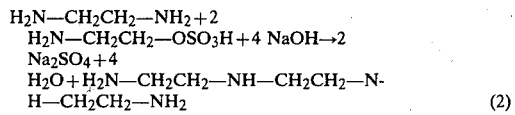

$$H_2N-CH_2CH_2-NH_2 + 2\ H_2N-CH_2CH_2-OSO_3H + 4\ NaOH \rightarrow 2\ Na_2SO_4 + 4\ H_2O + H_2N-CH_2CH_2-NH-CH_2CH_2-NH-CH_2CH_2-NH_2 \quad (2)$$

Nitrogen analysis of the polyalkylenepolyamine indicated about 60% of primary nitrogen, about 40% of secondary nitrogen and about 0.9% of tertiary nitrogen. If, in contrast, 4 moles of 2-aminoethyl sulfate are used per mole of ethylenediamine, a polyalkylenepolyamine containing 50% of primary nitrogen, about 32% of secondary nitrogen and about 26% of tertiary nitrogen is obtained. This polyalkylenepolyamine contains 6 nitrogen atoms and consists of a mixture of different polyalkylenepolyamines.

If, in polyaminoalkylating ethylenediamine, 2-aminoethyl sulfate is employed in even larger amount, the products obtained are difficult to analyze with regard to the bonding of the nitrogen, and a precise structural formula can no longer be given. The increasingly higher degree of polymerization is advantageously defined in terms of the viscosity. For example, a polyaminoethylated ethylenediamine which has been prepared using a molar ratio of ethylenediamine to 2-aminoethyl sulfate of 1:35 has a viscosity of 500 mPa.sec in 50% strength aqueous solution, whilst using a molar ratio of 1:100 the viscosity is 800 mPa.sec, and using a molar ratio of 1:500 it is 3,000 mPa.sec.

In contrast, reaction of ethylenediamine with pure ethyleneimine, retaining the same molar ratios, gives completely different values of the viscosity of the 50% strength aqueous polyalkylenepolyamine solutions. A comparison of two polyalkylenepolyamines which each contain 37 nitrogen atoms, one having been prepared by reacting 1 mole of ethylenediamine with 35 moles of 2-aminoethyl sulfate and the other by reacting 1 mole of ethylenediamine with 35 moles of ethyleneimine also shows that in addition to differing in viscosity, the products differ in the contents of primary, secondary and tertiary nitrogen, as may be seen from the Table which follows.

TABLE

| 1 mole of ethylenediamine reacted with | |
|---|---|
| (a) 35 moles of 2-aminoethyl sulfate | |
| primary N | 7.2% |
| secondary N | 5.9% |
| tertiary N | 4.1% |
| Viscosity of a 50% strength aqueous solution | 600 mPa.sec. Brookfield |
|  | 830 mPa.sec. Höppler |
| (b) 35 moles of ethyleneimine | |
| primary N | 4.9% |
| secondary N | 4.6% |
| tertiary N | 3.5% |
| Viscosity of a 50% strength aqueous solution | 450 mPa.sec. Brookfield |
|  | 450 mPa.sec. Höppler |

The process according to the invention can be carried out continuously or batchwise. Depending on the degree of aminoalkylation, ie. the ratio of amine to compounds of the formula I, the consistency, in the anhydrous state, of the polyalkylenepolyamines obtained varies from mobile through viscous to solid. Such polyamines are used in a great diversity of fields, depending on the viscosity of the product. For example, oligoamines containing from 4 to 8 nitrogen atoms are used as petroleum auxiliaries, eg. as engine oil additives, and also as curing agents for epoxy resins and as starting materials for the manufacture of assistants for the paper industry. The higher amines are also used in the paper industry, either directly in the form of aqueous solutions or after crosslinking by means of polyfunctional compounds, as retention aids and drainage aids. Furthermore, they are employed as intermediates for the manufacture of agents for flocculating solids in effluents, and an adhesion promoters for hydrophobic coatings on paper, regenerated cellulose film and aluminum foil. The products prepared according to the process of the invention are also used for combating the growth of algae, bacteria and fungi in aqueous systems, as antistatic agents, as textile assistants, as rust-protection agents and as assistants in electroplating.

The Examples which follow illustrate the invention. In the Examples, parts and percentages are by weight.

EXAMPLE 1

3,840 parts (24 moles) of 25% strength sodium hydroxide solution, 1,692 parts (12 moles) of 98% strength 2-aminoethyl sulfate and 36 parts (0.6 mole) of ethylenediamine are introduced, with thorough mixing, into a 6 liter four-neck flask equipped with a stirrer, reflux condenser and thermometer. The contents of the flask initially cool from 25° to 15° C., whilst the 2-aminoethyl sulfate dissolves. The mixture is then raised to the boil in the course of about 1 hour; the boiling point of the mixture is from 96° to 105° C. The reaction is complete after the mixture has refluxed for 65 hours. The contents of the flask are then cooled to 30°–35° C., whilst stirring. The stirrer is then stopped to allow the reaction mixture to sediment. After about 5 minutes, the sodium sulfate has settled out on the bottom of the flask and the aqueous phase has separated into two layers. The upper layer, containing polyalkylenepolyamines, is separated off. This phase consists of 400 parts (35%) of polyalkylenepolyamines, 894 parts (64%) of water and 14 parts (1%) of sodium sulfate.

The lower aqueous phase contains 1,986 parts (71%) of water, 700 parts (25%) of sodium sulfate and 52 parts (1.85%) of polyamine. In addition, 986 parts of sodium sulfate are present as sediment. The yield of polyalkylenepolyamine in the upper phase which is separated off is 90.5% of theory.

EXAMPLE 2

Instead of 2-aminoethyl sulfate, specified in Example 1, 12 moles of the compound of the formula

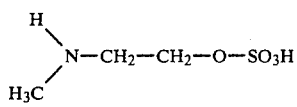

are employed. The conditions correspond to those of Example 1. The reaction is complete after 70 hours. At this point, aziridine rings are no longer detectable by means of γ-4-nitrobenzylpyridine. An upper aqueous phase, containing 36% of polyamines, forms; this upper phase contains 1.2% of sodium sulfate. The lower aqueous phase contains 26% of sodium sulfate and 1.5% of polyalkylenepolyamine. The yield of polyalkylenepolyamine in the upper layer is 92% of theory.

EXAMPLE 3

Example 1 is repeated, except that instead of 2-aminoethyl sulfate 12 moles of the compound of the formula

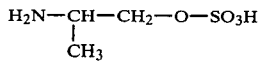

are employed. The reaction is complete after about 90-100 hours. After this time aziridine rings are no longer detectable with γ-4-nitrobenzylpyridine. When the reaction mixture has sedimented, an upper aqueous phase consisting of a 38% strength aqueous solution of polyalkylenepolyamines and 1% of sodium sulfate is obtained. The lower aqueous phase contains 25% of sodium sulfate and 1.2% of polyalkylenepolyamine. The upper aqueous phase contains 93% of the theoretically possible amount of polyalkylenepolyamine.

COMPARATIVE EXAMPLE 1

If the procedure described in Example 1 is followed but using aqueous sodium hydroxide solution of 12.5% strength instead of 25% strength, sodium sulfate does not precipitate after completion of the reaction and after cooling. Furthermore, the reaction mixture does not separate into two phases.

COMPARATIVE EXAMPLE 2

Example 1 is repeated, except that the strength of the aqueous sodium hydroxide solution used is 50% instead of 25%. The reaction mixture does not separate into two layers after cooling, but sedimentation of the sodium sulfate takes place.

EXAMPLE 6

Example 1 is essentially repeated, except that the lower aqueous phase obtained is recycled. To do this, the lower aqueous phase obtained in Example 1 is first introduced into the reactor, 1,230 parts of 2-aminoethyl sulfate, 700 parts of 100% pure sodium hydroxide (corresponding to 25% strength aqueous sodium hydroxide solution in the reaction mixture) and 26 parts of ethylenediamine are added. The reaction mixture is then raised to the boil as described in Example 1, and is kept at this temperature for 65 hours. After this time, aziridine rings are no longer detectable by means of γ-4-nitrobenzylpyridine. The reaction mixture is then cooled to 30°-35° C., whilst stirring. Thereafter it is allowed to sediment and the resulting upper phase is separated off. It consists of 396 parts (36%) of polyethylenepolyamine, 693 parts (63%) of water and 11 parts (1%) of sodium sulfate. The lower phase contains 1,607 parts (71%) of water, 612 parts (27%) of sodium sulfate and 45 parts (2%) of polyethylenepolyamine. 1,317 parts of sodium sulfate have settled out at the bottom of the vessel. The yield of polyethylenepolyamine is 98.5% of theory.

EXAMPLE 7

Example 6 is repeated, but with the additional introduction of 0.1% of 1,2-dichloropropane, to act as a catalyst, into the reaction mixture. The catalyst is added to the cold reaction solution. The reaction is complete after 10 hours, at which stage no further aziridine rings are detectable by means of γ-4-nitrobenzylpyridine. The reaction mixture is worked up as described in Example 6; the yield of polyamine and the distribution of the polyamine between the layers corresponds to that in Example 6.

EXAMPLE 8

The procedure followed is in principle as described in Example 6, but parts of the lower phase of a batch run with 36% strength sodium hydroxide solution are recycled. 1,440 parts of 100% pure sodium hydroxide (36 moles) (corresponding to 36% strength aqueous sodium hydroxide solution in the reaction mixture), 2,540 parts of 2-aminoethyl sulfate (18 moles) and 54 parts (0.9 mole) of ethylenediamine are added. 0.1% of sucrose is added as a catalyst. The reaction is complete after 11 hours. The reaction mixture is cooled to 30° C., whilst stirring. The stirrer is then stopped and the reaction mixture is allowed to sediment. Phase separation is complete after 3 minutes. The upper phase consists of 810 parts (36%) of polyethylenepolyamine, 1,400 parts (63%) of water and 22 parts (1%) of sodium sulfate. The lower phase contains 1,485 parts (75%) of water, 400 parts (21%) of sodium sulfate and 74 parts (3.7%) of polyethylenepolyamine. 3,014 parts of sodium sulfate are present as a sediment. The yield of amine, in the upper aqueous phase separated off, is 99.5% of theory.

EXAMPLE 9

A mixture of 30 parts of 2-aminoethyl sulfate, 17 parts of 100% pure sodium hydroxide, 31 parts of water, 0.6 part of ethylenediamine and 0.1 part of ethylene chloride are introduced into a stirred kettle of 150 liters capacity.

The reactants are brought to the boil, with vigorous mixing. The reaction is complete after 10 hours. The reaction mixture is then cooled to 30° C., with continued mixing. It is then allowed to sediment and after 10 minutes two layers are obtained. The upper phase is separated off. It consists of 9.4 parts of a polyamine mixture, 0.14 part of sodium sulfate and 13.6 parts of water. The lower phase consists of 25.4 parts of water, 8.6 parts of sodium sulfate and 1.4 parts of a polyamine mixture. The yield of polyamine is 98% of theory.

EXAMPLE 10

The procedure of Example 9 is followed, but instead of ethylenediamine 0.61 part of ethanolamine is used. The reaction is complete after 9½ hours. The composition of the upper and lower aqueous phases corresponds to that described in Example 9. The yield is about 99% of theory.

EXAMPLE 11

The procedure described in Example 9 is followed, but instead of ethylenediamine 2.3 parts of aniline are used. The reaction is complete after 6 hours. About 97% of the polyamine separate out as an upper phase, containing 61% of water and 0.8% of sodium sulfate.

EXAMPLE 12

The procedure described in Example 9 is followed, but instead of ethylenediamine 0.8 part of hydrazine is used. The reaction is complete after 8 hours. The composition of the upper polyamine phase corresponds roughly to that in Example 11.

EXAMPLE 13

The procedure described in Example 9 is followed, but instead of ethylenediamine 1.5 parts of urea are used. The reaction is complete after 12 hours. About 96% of the aminoethylated urea separate out as an upper phase containing 66% of water and 1.2% of sulfate.

EXAMPLE 14

The procedure described in Example 9 is followed, but instead of ethylenediamine 2.18 parts of morpholine are used. The composition of the upper phase corresponds roughly to that in Example 11.

EXAMPLE 15

The procedure described in Example 9 is followed, but instead of ethylenediamine 1.35 parts of the Na salt of glycine are used. 94% of the aminoethylated glycine separate out as an upper phase containing 1.2% of sodium sulfate and 68% of water.

We claim:

1. In a process for the manufacture of polyalkylenepolyamines wherein a primary or secondary amine is reacted with a compound of the formula

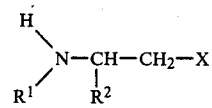

where X is —Cl, —Br or —OSO$_3$H and R$^1$ and R$^2$ are H or saturated alkyl of 1 to 4 carbon atoms in a molar ratio of at least 2 moles of I per mole of amine, and with at least the stoichiometric amount, based on the compound of the formula I of an alkali metal hydroxide or alkaline earth metal hydroxide, the improvement which comprises: carrying out the reaction at a temperature of from 60° to 200° C. and in the presence of an aqueous solution of the alkali metal hydroxide or alkaline earth metal hydroxide having a strength of from 15 to 45 percent, cooling the reaction mixture with continuous mixing to a temperature at which two aqueous phases form, and thereafter separating off the upper aqueous phase containing the polyalkylenepolyamines.

2. A process as claimed in claim 1, wherein the reaction is carried out at the boiling point of the reaction mixture.

3. A process as claimed in claim 1, wherein the reaction is carried out in the presence of a catalytic amount of a compound which initiates the polymerization of alkyleneimines.

4. A process as claimed in claim 3, wherein a halohydrocarbon is used as the polymerization initiator.

5. The process of claim 1, wherein compound I is 2-aminoethyl sulfate.

* * * * *